United States Patent [19]
Bux et al.

[11] Patent Number: 5,739,428
[45] Date of Patent: Apr. 14, 1998

[54] SYSTEM FOR SPEED-CONTROLLED BALANCING THE WHEEL OF A MOTOR VEHICLE

[75] Inventors: Hermann Bux, Pocking; Peter Ross, Munich, both of Germany

[73] Assignee: Beissbarth GmbH, Munich, Germany

[21] Appl. No.: 656,315

[22] PCT Filed: Sep. 7, 1995

[86] PCT No.: PCT/EP95/03518

§ 371 Date: Jun. 10, 1996

§ 102(e) Date: Jun. 10, 1996

[87] PCT Pub. No.: WO96/07881

PCT Pub. Date: Mar. 14, 1996

[30] Foreign Application Priority Data

Sep. 8, 1994 [DE] Germany ............... 44 32 025.6

[51] Int. Cl.[6] ........................................... G01M 1/06
[52] U.S. Cl. ........................................... 73/146; 73/462
[58] Field of Search .................... 73/146, 462, 464, 73/468, 474

[56] References Cited

U.S. PATENT DOCUMENTS

| | | | |
|---|---|---|---|
| 3,910,121 | 10/1975 | Churchod et al. | 73/462 |
| 4,014,139 | 3/1977 | Shooter et al. | 51/5 R |
| 4,046,017 | 9/1977 | Hill | 73/462 |

FOREIGN PATENT DOCUMENTS

WO9419864  9/1994  WIPO.

*Primary Examiner*—William L. Oen
*Attorney, Agent, or Firm*—Hazel & Thomas, P.C.

[57] ABSTRACT

A balancing machine for balancing a wheel, wherein the wheel is rotated by a drive device for measuring the unbalance, is provided with a speed control device for controlling the speed of the drive device. The speed control device includes a computer and a frequency converter. Further drive devices can be switched by a switch-over device.

10 Claims, 1 Drawing Sheet

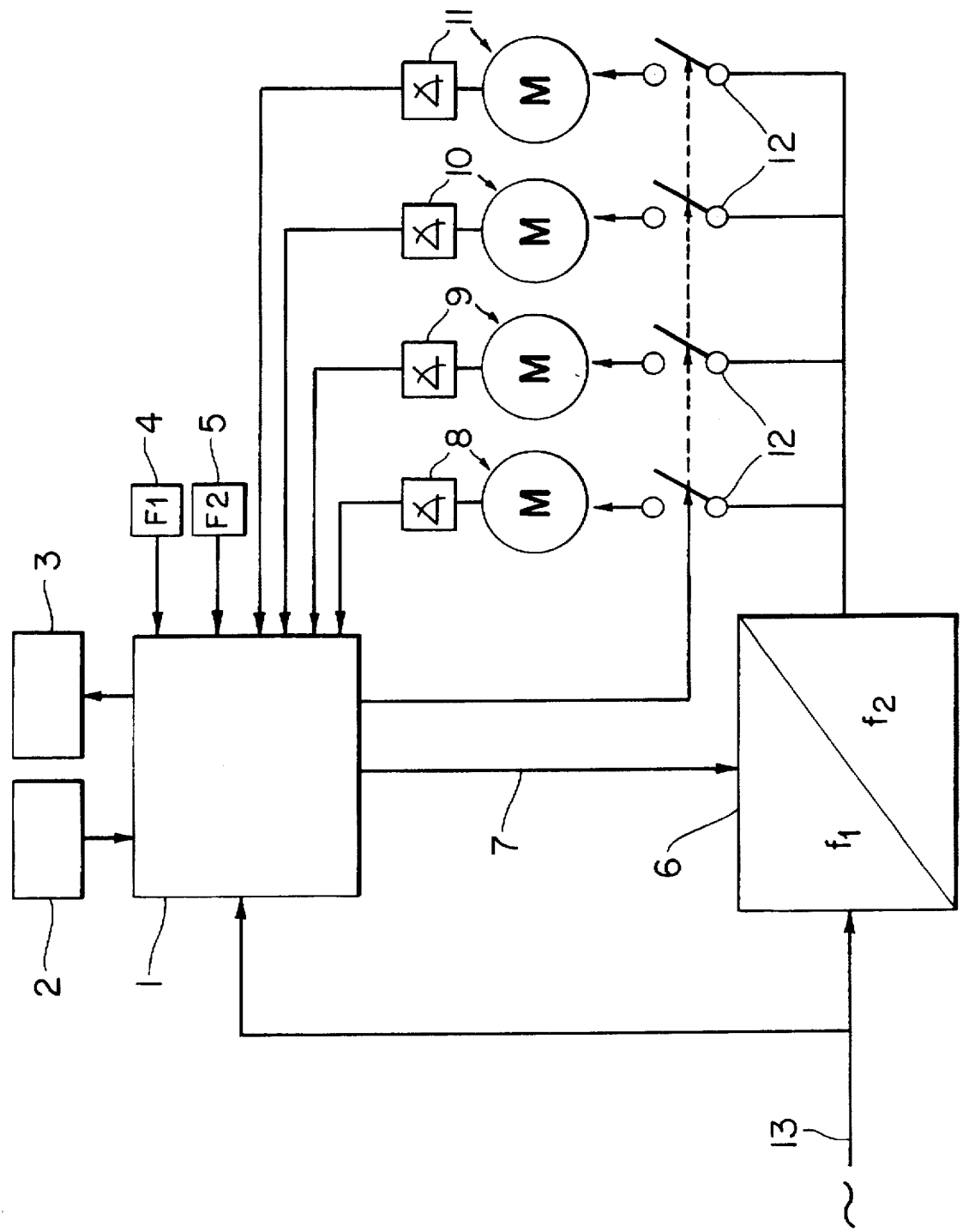

5,739,428

1

SYSTEM FOR SPEED-CONTROLLED BALANCING THE WHEEL OF A MOTOR VEHICLE

BACKGROUND OF THE INVENTION

1. Field of the Invention

This invention relates to a balancing machine for balancing a wheel, in particular a motor vehicle wheel, wherein the wheel to be balanced is rotatably mounted on a shaft. The shaft is coupled with a sensor which detects the unbalance forces during turning of the wheel. The sensor is connected with a computer which determines the unbalance data from the output signals of the sensor in conjunction with the wheel-specific data.

2. Description of the Prior Art

A disadvantage of conventional balancing machines is that the balancing run always takes place in the same way and cannot be adapted to different requirements as, for example, high balance quality or short duration of measurement.

The disadvantage of conventional devices is the optimization of operation in accordance with the particular requirements, specifically balance quality and duration of measurement.

SUMMARY OF THE INVENTION

This above-described problem is solved with an apparatus that incorporates a drive device rotating the wheel for measuring the imbalance, and a speed control device for controlling the speed of the drive device. The speed control device includes a controllable frequency converter and a computer.

Advantageous embodiments include the features of a number of drive devices and a switch-over device being controllable by the computer for alternatively connecting the drive devices with the speed control device, with the drive devices being controllable by the computer with respect to the speed control devices. In addition, a drive device for opening and closing a wheel protection bow by the motor in accordance with the position of the wheel protection bow is used, wherein the drive device is controllable by the speed control device. Other features include a drive device for driving a device for determining the wheel-specific data, the drive device being controllable by the speed control device; a drive device for driving a device for mounting balancing weights on the wheel that is controllable by the speed control device; the speed control device being adapted to increase or reduce the speed slowly; the speed control device being adapted to control the speed in accordance with a selected balance quality; and the speed control device having a device for monitoring the current consumption in the drive devices so that an emergency shutdown of the drive devices takes place when a maximum admissible current consumption is exceeded.

According to the invention, the wheel can be driven at different speeds for the balancing run. This makes it possible to optimize the balancing run, for example, for a short duration of the balancing process or a high balance quality with high measuring precision. If the duration of the balancing process is to be kept short, the shaft can be driven according to the present invention at low speeds, which involves short run-up times and braking times. If the balance quality is most important, however, high speeds of the wheel are necessary for obtaining a high output signal from the unbalance sensor.

2

In a preferred embodiment, the speed control is performed with the help of a frequency converter.

With regard to the duration of the balancing run, the invention further allows in an advantageous embodiment for the wheel to be turned automatically (by motor) into the balancing position at the end of the balancing run and held there for mounting the balancing weights. It is thus unnecessary to turn in the wheel manually as is done in conventional systems.

The computer-controlled speed control device can also be applied advantageously to other drive motors in the balancing machine, for example for motor-driven opening and closing of a wheel protection bow or a motor-driven device for determining the wheel-specific data and/or mounting balancing weights.

In the preferred embodiment, the computer further monitors the current consumption of the motor or motors and switches them off if necessary.

DETAILED DESCRIPTION OF THE PREFERRED EMBODIMENT

The invention will be described in the following in a preferred embodiment with reference to the accompanying drawing, which shows a block diagram of a speed control device for a balancing machine according to the invention.

The drawing shows computer 1 which is provided with input unit 2 and output unit 3. Two electric unbalance sensors 4 and 5 which are coupled with the balancing shaft (not shown) provide their output signals to computer 1. Computer 1 is connected to supply voltage 13 in parallel with frequency converter 6 and controls frequency converter 6 via control line 7. A plurality of motors 8 to 11 with position indicators are connected to the supply voltage via frequency converter 6 and respective switches 12. The outputs of the position indicators are fed to computer 1 via respective lines.

In the shown embodiment, a plurality of motors are parallel-connected, whereby only motor 8 serves to drive the balancing shaft. Of the remaining motors, motor 9 is provided for opening and closing the wheel protection bow; motor 10 drives a scanning device or the like (not shown) for determining the wheel-specific data; and motor 11 is for automatically mounting balancing weights.

In operating the output frequency, output voltage and output current of frequency converter 6 are controlled by the computer via a suitable interface. The output of the frequency converter is switched to the various motors by means of suitable switch-over device 12. In this way computer 1 controls the speed of the motors via frequency converter 6.

When the motors are started the frequency converter is controlled in such a way that its output frequency rises slowly, and when the motors are braked it sinks slowly, so that a softstart and soft braking occur. The computer can furthermore control the output frequency of the frequency converter in such a way that the balancing shaft is driven at different speeds in accordance with a wavy balance quality during the balancing run.

For turning in the wheel for mounting the balancing weights the computer controls motor 8 via the frequency converter in accordance with the angular position of the balancing shaft in such a way that the balancing shaft is turned into the balancing position by motor and held there. The balancing weights can then be mounted automatically with the help of a mounting device (not shown) which is driven by motor 11.

The balancing weights can be mounted sequentially, whereby the wheel is first turned in to a balancing position automatically and the user mounts the suitable balancing weight and confirms this to the machine. The wheel is then turned to the next mounting position automatically, etc. If the mounting of the balancing weights is also performed automatically, the user's involvement is unnecessary.

The computer presets a maximum current consumption of the motors for the frequency converter and constantly monitors the current consumption, whereby an emergency shutdown of the motors takes place when the maximum admissible current consumption is exceeded.

Although the present invention has been fully described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims, unless they depart therefrom.

We claim:

1. A balancing machine for balancing a wheel, comprising:

a drive device for rotating a wheel for measuring an imbalance in the wheel, said drive device including a motor and a balancing shaft;

means for measuring the imbalance; and a speed control device for controlling the speed of the drive device, said speed control device including a controllable frequency converter and means for controlling the controllable frequency converter so as to softly start and brake the balancing shaft and thereby control the balancing shaft at selected speeds, said control means including a computer.

2. The balancing machine of claim 1, wherein a number of drive devices and a switch-over device which is controllable by the computer for alternatively connecting the drive devices with the speed control device.

3. The balancing machine of claim 1, wherein a number of drive devices with respective speed control devices which are controllable by the computer.

4. The balancing machine of claim 1, wherein a drive device for opening and closing a wheel protection bow by motor in accordance with the position of the wheel protection bow, said drive device being controllable by the speed control device.

5. The balancing machine of claim 1, wherein a drive device for driving a device for determining the wheel-specific data, said drive device being controllable by the speed control device.

6. The balancing machine of claim 1, wherein a drive device for driving a device for mounting balancing weights on the wheel, said drive device being controllable by the speed control device.

7. The balancing machine of claim 1, wherein the speed control device is adapted to increase or reduce the speed slowly.

8. The balancing machine of claim 1, wherein the speed control device is adapted to control the speed in accordance with a selected balance quality.

9. The balancing machine of claim 1, wherein the speed control device has a device for monitoring the current consumption in the drive devices so that an emergency shutdown of the drive devices takes place when a maximum admissible current consumption is exceeded.

10. The balancing machine of claim 1, wherein said control means further includes means for controlling the motor via the controllable frequency converter based on an angular position of the balancing shaft such that the balancing shaft is turned into a balancing position by the motor and held in the balancing position.

* * * * *